United States Patent
Ackermann et al.

(10) Patent No.: US 9,708,513 B2
(45) Date of Patent: *Jul. 18, 2017

(54) SEALING DEVICE WITH IMPROVED ADHESION

(71) Applicant: Sika Technology AG, Baar (CH)

(72) Inventors: Herbert Ackermann, Tann (CH); Matthias Gössi, Uster (CH); Frank Hoefflin, Baden (CH); Stefan Keiser, Schwarzenberg (CH); Roman Rohrer, Sarnen (CH); Jean-Claude Rudolf, Horw (CH)

(73) Assignee: SIKA TECHNOLOGY AG, Baar (CH)

( * ) Notice: Subject to any disclaimer, the term of this patent is extended or adjusted under 35 U.S.C. 154(b) by 322 days.

This patent is subject to a terminal disclaimer.

(21) Appl. No.: 14/399,228

(22) PCT Filed: May 6, 2013

(86) PCT No.: PCT/EP2013/059412
§ 371 (c)(1),
(2) Date: Feb. 27, 2015

(87) PCT Pub. No.: WO2013/167546
PCT Pub. Date: Nov. 14, 2013

(65) Prior Publication Data
US 2015/0166852 A1 Jun. 18, 2015

(30) Foreign Application Priority Data

May 7, 2012 (CH) .................................. 0641/12
Sep. 7, 2012 (EP) .................................. 12183595

(51) Int. Cl.
*C09J 131/04* (2006.01)
*C08K 5/23* (2006.01)
(Continued)

(52) U.S. Cl.
CPC ............... *C09J 131/04* (2013.01); *B32B 5/02* (2013.01); *B32B 5/18* (2013.01); *B32B 5/245* (2013.01);
(Continued)

(58) Field of Classification Search
CPC ........... C09J 131/04; C09J 11/06; C08K 5/23; B32B 37/12; B32B 37/167
See application file for complete search history.

(56) References Cited

U.S. PATENT DOCUMENTS

2013/0157048 A1* 6/2013 Rudolf ................. C09D 163/00
428/339

FOREIGN PATENT DOCUMENTS

| JP | H01-123729 A | 5/1989 |
| JP | 2002-030262 A | 1/2002 |
| WO | WO-2012/034983 | 3/2012 |

OTHER PUBLICATIONS

International Preliminary Report on Patentability for PCT/EP2013/059412, issued Nov. 11, 2014.
(Continued)

*Primary Examiner* — Daniel Lee
(74) *Attorney, Agent, or Firm* — Foley & Lardner LLP

(57) ABSTRACT

The present invention relates to a sealing device (1) which comprises a barrier layer (2) with a thermoplastic polymer P1, and an adhesive layer (3) with at least one ethylene-vinyl acetate copolymer (EVA) P2 and azo-dicarbonamide A, and which is suitable for sealing bases in the building sector. The invention further relates to a method for sealing said bases. The method according to the invention allows structures of civil engineering to be sealed rapidly and efficiently and ensures good adhesion of the sealing device on the base.

18 Claims, 8 Drawing Sheets

(51) Int. Cl.
| | |
|---|---|
| C09J 11/06 | (2006.01) |
| B32B 37/16 | (2006.01) |
| B32B 37/12 | (2006.01) |
| B32B 5/02 | (2006.01) |
| B32B 5/18 | (2006.01) |
| B32B 5/24 | (2006.01) |
| B32B 27/06 | (2006.01) |
| B32B 27/08 | (2006.01) |
| B32B 27/12 | (2006.01) |
| B32B 27/18 | (2006.01) |
| B32B 27/30 | (2006.01) |
| B32B 27/32 | (2006.01) |
| B32B 37/18 | (2006.01) |
| C09J 5/06 | (2006.01) |
| C09J 7/02 | (2006.01) |
| C09J 123/06 | (2006.01) |
| C09J 123/08 | (2006.01) |
| C09J 123/12 | (2006.01) |
| C09J 123/16 | (2006.01) |

(52) U.S. Cl.
CPC ............ *B32B 27/065* (2013.01); *B32B 27/08* (2013.01); *B32B 27/12* (2013.01); *B32B 27/18* (2013.01); *B32B 27/306* (2013.01); *B32B 27/308* (2013.01); *B32B 27/32* (2013.01); *B32B 37/1207* (2013.01); *B32B 37/1292* (2013.01); *B32B 37/16* (2013.01); *B32B 37/18* (2013.01); *C08K 5/23* (2013.01); *C09J 5/06* (2013.01); *C09J 7/0264* (2013.01); *C09J 11/06* (2013.01); *C09J 123/06* (2013.01); *C09J 123/08* (2013.01); *C09J 123/12* (2013.01); *C09J 123/16* (2013.01); *B32B 2250/02* (2013.01); *B32B 2250/03* (2013.01); *B32B 2250/04* (2013.01); *B32B 2250/05* (2013.01); *B32B 2250/246* (2013.01); *B32B 2250/40* (2013.01); *B32B 2260/021* (2013.01); *B32B 2260/046* (2013.01); *B32B 2266/025* (2013.01); *B32B 2270/00* (2013.01); *B32B 2307/7265* (2013.01); *B32B 2309/02* (2013.01); *B32B 2395/00* (2013.01); *B32B 2405/00* (2013.01); *B32B 2419/00* (2013.01); *B32B 2581/00* (2013.01); *C09J 2201/122* (2013.01); *C09J 2423/04* (2013.01); *C09J 2423/10* (2013.01); *C09J 2423/16* (2013.01); *C09J 2431/00* (2013.01); *Y10T 156/10* (2015.01); *Y10T 428/249983* (2015.04); *Y10T 428/287* (2015.01); *Y10T 428/2878* (2015.01); *Y10T 428/2891* (2015.01); *Y10T 428/31938* (2015.04)

(56) References Cited

OTHER PUBLICATIONS

International Search Report and Written Opinion on PCT/EP2013/059412, mailed Aug. 6, 2013.
Second Office Action issued on Chinese Application 201380032788.8, mailed May 12, 2016.
Notice of Reasons for Rejection mailed on Apr. 25, 2017 in JP Application No. 2015-510769 (English translation included—6 pages).

\* cited by examiner

250
SEALING DEVICE WITH IMPROVED ADHESION

CROSS REFERENCE TO RELATED APPLICATIONS

This application is a national stage application of International Application Serial No. PCT/EP2013/059412, filed on May 6, 2013, which in turn claims the benefit of EP 12183595.3, filed on Sep. 7, 2012, and CH 00641/12, filed on May 7, 2012, and all of which are hereby incorporated by reference in their entirety, for any and all purposes.

TECHNICAL FIELD

The invention relates to the field of sealing substrates and bases, in particular in the construction field.

STATE OF THE ART

Substrates and bases that must be waterproofed, in particular concrete structures, can be found in large numbers in structural and civil engineering. Such substrates and bases are typically sealed by way of bitumen sheets or mechanically attached plastic membranes. However, due to their thermoplastic behavior, bitumen sheets are susceptible to temperature fluctuations. Elastic plastic membranes, in contrast, exhibit elastic behavior that is constant over a wide temperature range and thus fulfill their function as a seal even under extreme temperature conditions. The combination of a plastic membrane with bitumen is not used due to numerous disadvantages. One problem, among other things, is that a good adhesive bond between the plastic membrane in combination with bitumen and a substrate or a base must be present, which naturally encompasses adhesion of all intermediate layers. The adhesion and compatibility between the plastic sheet and bitumen in particular poses a problem that is very difficult to solve as a result of the materials that are involved.

This system moreover has the major disadvantage that high heat output is required to fully melt the bitumen, which typically necessitates the use of an open flame. This is not only expensive, but the high heat output of such an open flame, which is difficult to control, can result in smoldering. Additionally, this system requires the plastic membrane, if a plastic membrane is used, to be applied directly after the bitumen has been melted, which makes positioning of the plastic membrane in advance impossible. Moreover, it is not possible to step on the base after the bitumen has been melted and before the sealing material is applied.

DESCRIPTION OF THE INVENTION

It is therefore the object of the present invention to provide a sealing device which does not have the disadvantages of the state of the art, and which in particular can be created and applied easily and efficiently and results in a good adhesive bond between the sealing device and the substrate or base. Moreover, a high level of waterproofing is to be ensured.

Surprisingly, it was found that this object can be achieved by a sealing device. Such a sealing device allows a substrate or a base, and more particularly a concrete structure, to be sealed quickly and cost-effectively.

It was further shown that the preferred embodiments can be used to easily avoid an essential problem of the related art, namely that of applying the adhesive promoter, this being the bitumen, in a uniform and controlled manner, and that thus quality assurance in the creation of a seal can be considerably increased.

Another major advantage here is that the necessary adhesive promoter can be distributed and fixed in a controlled manner on the sealing layer in an industrial process, and that this sealing layer can be used at the construction site ready-made with the adhesive promoter, namely an adhesive layer. In particular, it is advantageous that the use of mastic asphalt can be dispensed with.

Moreover, such sealing devices can also be applied to a base without open flame, which is in particular a safety advantage.

Another major advantage is the option of movably disposing the sealing device prior to the application to the base, due to the features of the adhesive layer. When provided in a suitable location, the sealing device can be firmly bonded to the base thereafter by heating the adhesive layer.

Further aspects of the invention are the subject matter of further independent claims. Particularly preferred embodiments of the invention are the subject matter of the dependent claims.

Ways to Implement the Invention

In a first aspect, the present invention relates to a sealing device 1, comprising
a sealing layer 2, comprising a thermoplastic polymer P1, and an adhesive layer 3, comprising
at least one ethylene-vinyl acetate copolymer (EVA) P2, and
azodicarbonamide A.

The sealing layer 2 is preferably bonded directly to the adhesive layer 3. The expression "bonded directly" shall be understood to mean that no further layer or substance is present between two materials, and that the two materials are directly bonded to each other or adhere to each other. The two materials can be present mixed with each other at the transition between the two materials. The adhesive layer 3 can be bonded to the sealing layer 2 across the entire surface or discontinuously, in particular across the entire surface.

FIG. 1 shows the composition of such a sealing device 1 comprising a sealing layer 2 and an adhesive layer 3, where the sealing layer 2 is bonded directly to the adhesive layer 3.

If the sealing layer 2 is bonded directly to the adhesive layer 3, this is advantageous insomuch as the sealing layer and the adhesive layer can thus be coextruded, for example, and moreover a good bond of the two layers is ensured.

If the sealing layer 2 is bonded directly to the adhesive layer 3, it is particularly advantageous if the sealing layer and the adhesive layer include polymers that are compatible with, and more particularly can be homogeneously mixed with, the polymers of the other layer.

For example, it is in particular advantageous if the thermoplastic polymer P1 of the sealing layer 2 is polyethylene (PE) or a copolymer of ethylene and propylene.

It is further preferred if the sealing layer 2 comprises more than 40% by weight of the polymers P1 listed above as preferred polymers P1, based on the total weight of the sealing layer 2.

The sealing layer 2 particularly preferably comprises 70 to 100% by weight, in particular 90 to 100% by weight, and in particular 95 to 100% by weight of polymers P1 selected from the list consisting of polyethylene (PE) and copolymers of ethylene and propylene, based on the total weight of the polymers present in the sealing layer 2.

To be as suitable as possible as the sealing layer 2, it should be as waterproof as possible and not decompose or be mechanically damaged even under the prolonged influence of water or moisture.

The sealing layer 2 comprises a thermoplastic polymer P1. The thermoplastic polymer P1 is preferably thermoplastic polyolefins and/or polyvinyl chloride (PVC).

The thermoplastic polymer P1 particularly preferably is a polymer selected from the group consisting of high-density polyethylene (HDPE), medium-density polyethylene (MDPE), low-density polyethylene (LDPE), polyethylene (PE), polypropylene (PP), polyethylene terephthalate (PET), polystyrene (PS), polyvinyl chloride (PVC), polyamide (PA), ethylene vinyl acetate (EVA), chlorosulfonated polyethylene, and polyolefin-based thermoplastic elastomers (TPO).

Most preferably the thermoplastic polymer P1 of the sealing layer 2 is polyethylene (PE) or a copolymer of ethylene and propylene.

In particular sheets as they are already used in the prior art for sealing purposes in structural and civil engineering are suited as the sealing layer. So as to be damaged or modified as little as possible by heating when the sealing device is applied to a base, it is particularly advantageous if the sealing layer are produced from a material having a softening point of greater than 70° C., and preferably between 80° C. and 110° C. The sealing layer should advantageously have at least a low degree of elasticity, for example so as to be able to accommodate differences in expansion between the sealing device and the substrate or base caused by temperatures, or stress caused by cracks in the base, without the sealing layer becoming damaged or tearing and impairing the sealing function of the sealing layer.

The sealing layer 2 preferably has a thickness of 0.1 to 10 mm, and more particularly of 1 to 5 mm.

The sealing layer 2 preferably includes a foamed portion 2a on the side facing the adhesive layer 3. This is shown in FIG. 2, for example. This is advantageous inasmuch as lower heat input is required to heat the adhesive layer. Moreover, it is also possible to use heat sources for heating, the heat input of which is not as easy to control.

It is further advantageous if the thickness of the foamed portion of the sealing layer 2a is 20 to 80%, and more particularly 45 to 65% of the entire thickness of the adhesive layer 2.

The density of the foamed portion of the sealing layer 2a is preferably 200 to 700 kg/m$^3$, and more particularly 300 to 500 kg/m$^3$.

The adhesive layer 3 comprises at least one ethylene-vinyl acetate copolymer (EVA) P2.

The ethylene-vinyl acetate copolymer P2 preferably has a vinyl acetate content of 7 to 30% by weight, in particular 15 to 30% by weight, preferably 25 to 30% by weight. This contributes to good adhesion to substrates, in particular concrete.

Moreover, it can be advantageous if the content of azodicarbonamide A1 is 0.1 to 15% by weight, in particular 0.5 to 5% by weight, particularly preferably 0.5 to 3% by weight, most preferably 0.5 to 2% by weight, relative to the total weight of the sum of (ethylene-vinyl acetate copolymer P2+azodicarbonamide A). This is beneficial for good adhesion to concrete.

It can also be advantageous if the content of azodicarbonamide A is 2 to 10% by weight, in particular 4 to 8% by weight, particularly preferably 4 to 6% by weight, relative to the total weight of the sum of (ethylene-vinyl acetate copolymer P2+azodicarbonamide A). Surprisingly, it was found that this results in particularly good adhesion to concrete surfaces which were pretreated with an epoxy resin-based primer.

Such epoxy resin-based primers have (before the curing) a free-flowing consistency at room temperature and are typically applied to the base by way of brushing, spraying or pouring. It should be noted that the term "free-flowing" here shall be understood to include not only liquid, but also honey-like to pasty materials having higher viscosities, the shape of which conforms under the influence of the gravitational force of the earth.

These are in particular two-component epoxy resin compositions, and more particularly such in which the one (this being the first) component includes an epoxy resin, and more particularly an epoxy resin based on bisphenol A diglycidyl ether, and the other one (this being the second) component includes a curing agent, and more particularly polyamine or polymercaptane. Moreover, the epoxy resin compositions are advantageously low-viscosity compositions, and more particularly have a viscosity of less than 10,000 mPas, and preferably between 10 and 1,000 mPas. Low-viscosity, two-component epoxy resin compositions as they are sold under the trade names Sikaprimer®, Sikafloor®, Sikagard® or Sika Ergodur® by Sika Deutschland GmbH, or Sika Schweiz AG, are considered particularly preferred two-component epoxy resin compositions.

Moreover, it can be advantageous if the adhesive layer 3 comprises 0 to 12% by weight, in particular 0 to 6% by weight, particularly preferably 0 to 1% by weight, most preferably 0% by weight, relative to the total weight of the adhesive layer, of a polymer P3, which is selected from the group consisting of:

maleic acid anhydride-functionalized polyethylene, in particular maleic acid anhydride-functionalized LDPE or maleic acid anhydride-functionalized HDPE (PE-MAH) and maleic acid anhydride functionalized copolymer made of ethylene and vinyl acetate (EVA-MAH).

This is beneficial for a good adhesion to concrete.

Moreover, it can also be advantageous if the adhesive layer 3 comprises in addition a polymer P3, which is selected from the group consisting of:

maleic acid anhydride-functionalized polyethylene, in particular maleic acid anhydride-functionalized LDPE or maleic acid anhydride-functionalized HDPE (PE-MAH) and maleic acid anhydride functionalized copolymer made of ethylene and vinyl acetate (EVA-MAH).

It is preferable for the content of polymer P3 to be 4 to 17% by weight, in particular 12 to 16% by weight, relative to the total weight of the sum of (ethylene-vinyl acetate copolymer P2+polymer P3+azodicarbonamide A); and the content of azodicarbonamide A is 2 to 6% by weight, in particular 4 to 6% by weight, relative to the total weight of the sum of (ethylene-vinyl acetate copolymer P2+copolymer P3+azodicarbonamide A).

As a result, good adhesion to concrete surfaces which were pretreated with an epoxy resin-based primer is achieved.

It is further advantageous if the adhesive layer 3 includes <1% by weight, in particular 0 to 0.5% by weight, preferably 0 to 0.1% by weight, and most preferably no epoxy resin at all, based on the total weight of the adhesive layer.

The term "epoxy resin" in the present document shall be understood to mean both solid epoxy resins and liquid epoxy resins.

This is beneficial, among other things, for improved adhesion, in particular to concrete, and in particular to concrete treated in advance with an epoxy resin primer. The adhesive layer 3 comprises azodicarbonamide A.

So as to lower the activation temperature of azodicarbonamide (also referred to as azobisformamide or diazenedicarboxylic acid diamide), for example, it can be advantageous to add a catalyst, such as zinc oxide or urea, to the azodicarbonamide, typically in an amount of 10 to 50% by weight, based on the total weight of the azodicarbonamide A.

The adhesive layer 3 is preferably tack-free at 23° C. The term "tack-free" in connection with the adhesive layer 3 in the entire present document shall be understood to mean surface stickiness within the meaning of instant adhesion or tack, which is so low at 23° C. that, upon pressing a thumb with a pressure force of approximately 5 kg for 1 second against the surface of the adhesive layer, the thumb does not stick to the surface of the adhesive layer, or the adhesive layer cannot be lifted. In this way, the sealing device can be stored, transported and processed more easily.

Particularly preferred are adhesive layers 3 comprising 70 to 99.5% by weight, in particular 80 to 99% by weight, preferably 90 to 99% by weight, ethylene-vinyl acetate copolymer P2, and 0.5 to 5% by weight, particularly preferably 0.5 to 3% by weight, preferably 0.5 to 2% by weight, azodicarbonamide A.

These adhesive layers preferably consist of more than 50% by weight, in particular more than 70% by weight, in particular more than 80% by weight, preferably more than 90% by weight, most preferably more than 98% by weight of the above-mentioned components P2 and A.

These adhesive layers preferably comprise 0 to 1% by weight, in particular 0% by weight, relative to the total weight of the adhesive layer, of a polymer P3, which is selected from the group consisting of:

maleic acid anhydride-functionalized polyethylene, in particular maleic acid anhydride-functionalized LDPE or maleic acid anhydride-functionalized HDPE (PE-MAH) and maleic acid anhydride functionalized copolymer made of ethylene and vinyl acetate (EVA-MAH).

Moreover, preferred are adhesive layers 3 comprising 70 to 98% by weight, in particular 80 to 96% by weight, preferably 90 to 96% by weight, ethylene-vinyl acetate copolymer P2, and 2 to 10% by weight, particularly preferably 4 to 8% by weight, preferably 4 to 6% by weight, azodicarbonamide A.

It is preferable for the adhesive layers to comprise more than 50% by weight, in particular more than 70% by weight, in particular more than 80% by weight, preferably more than 90% by weight, most preferably more than 95% by weight, of the above-mentioned components P2 and A.

It is preferable for the adhesive layers to comprise 0 to 1% by weight, in particular 0% by weight, relative to the total weight of the adhesive layer, of a polymer P3, which is selected from the group consisting of:

maleic acid anhydride-functionalized polyethylene, in particular maleic acid anhydride-functionalized LDPE or maleic acid anhydride-functionalized HDPE (PE-MAH) and maleic acid anhydride functionalized copolymer made of ethylene and vinyl acetate (EVA-MAH).

Moreover, preferred are adhesive layers 3 comprising 77 to 94% by weight, in particular 78 to 84% by weight, ethylene-vinyl acetate copolymer P2, and 4 to 17% by weight, in particular 12 to 16% by weight, of a polymer P3, which is selected from the group consisting of:

maleic acid anhydride-functionalized polyethylene, in particular maleic acid anhydride-functionalized LDPE or maleic acid anhydride-functionalized HDPE (PE-MAH) and maleic acid anhydride functionalized copolymer made of ethylene and vinyl acetate (EVA-MAH), and 2 to 6% by weight, in particular 4 to 6% by weight, azodicarbonamide A.

The adhesive layers preferably consist of more than 50% by weight, in particular more than 70% by weight, in particular more than 80% by weight, preferably more than 90% by weight, of the above-mentioned components P2, P3 and A.

It is further advantageous if the adhesive layer 3 has a thickness of 0.05 to 0.5 mm, 0.1 to 0.3 mm.

The sealing layer 2 can preferably comprise an adhesive layer 3 on both sides; this is shown in FIG. 3, for example. The sealing layer can comprise one or two foamed portions, as is apparent as 2a and 2b in FIG. 3, or not.

It can further be advantageous if the sealing layer 2 comprises a carrier layer 9. The carrier layer 9 contributes to the dimensional stability of the sealing layer. This is preferably a fiber material or a mesh, in particular a fiber material. The term "fiber material" in the entire present document shall be understood to mean a material composed of fibers. The fibers comprise or consist of organic or synthetic material. These are in particular cellulose fibers, cotton fibers, protein fibers, synthetic fibers or organic fibers, for example glass fibers. Preferably fibers made of polyester, or made of a homopolymer or copolymer of ethylene and/or propylene, or made of viscose, shall be primarily mentioned as synthetic fibers. The fibers can be short fibers or long fibers, spun, woven or unwoven fibers or filaments. The fibers can moreover be aligned or drawn fibers. Moreover, it can be advantageous to use different fibers, both in terms of geometry and composition, together.

The body composed of fibers can be produced using a wide variety of methods known to a person skilled in the art. In particular bodies that are a woven fabric, laid scrim or knitted fabric are used. A felt or nonwoven fabric is particularly preferred as the fiber material.

The carrier layer is preferably incorporated into the sealing layer; moreover, it is advantageous if the carrier layer 9 comprises intermediate spaces, which are at least partially interspersed with the material of the sealing layer 2. This is beneficial for a good bond between the sealing layer and the carrier layer.

It can moreover be advantageous if the sealing layer 2 comprises a topcoat 10, which is preferably applied to the side facing away from the adhesive layer 3. If the topcoat includes UV stabilizers, the topcoat can protect the sealing device from aging by sunlight, for example. If the topcoat includes color pigments, damage to the side of the sealing device which faces away from the adhesive layer, for example caused by the transport or by the installation, can be discovered by the absence of the topcoat at the damaged location.

A sealing device, the sealing layer of which comprises an incorporated carrier layer 9 and a topcoat 10, is shown in FIG. 4, for example.

It is further advantageous if the sealing device 1 is a flexible membrane, and more particularly a flexible sheet. This can be easily rolled up and thus easily stored and/or transported. The sealing device is thus easy to take to the construction site and can be unrolled there and cut to the required dimensions. This is a very cost- and time-efficient work step.

A further aspect of the present invention relates to a method for sealing a substrate S1 4, comprising the following steps:
i) applying a sealing device 1, as it is described above, to a substrate S1 4, wherein the adhesive layer 3 faces the substrate S1 4; and
ii) heating the adhesive layer 3 of the sealing device 1, preferably to a temperature of 80 to 600° C.

The substrate S1 4 is preferably a structural or civil engineering structure, which is to be sealed against moisture and water. Moreover, it can be the soil, a building, insulating material, or formwork. The substrate S1 4 can be horizontal, or not.

The material of the substrate S1 is in particular wood, metal, a metal alloy, a mineral binding agent such as concrete or gypsum, plastic material or thermal insulation material, such as foamed polyurethane, mineral wool or cellular glass (Foamglas). It is particularly preferred if the material is wood, metal, a metal alloy or concrete, in particular concrete. The material is most preferably concrete, in particular concrete.

The sealing device 1 can be applied to a substrate S1 4 in step i), for example, by unrolling the sealing device or installing the sealing device across the entire surface. If the adhesive layer 3 is an adhesive layer that is tack-free at 23° C., the sealing device can be conveniently (re)positioned on the substrate S1 until the heating process in step ii).

Heating can take place in any arbitrary manner. Heating can be achieved by external or by internal heat sources, such as an exothermic chemical reaction. The heating in step ii) is preferably carried out by way of hot air, flame application, ultrasound, induction welding or an electric resistance heating element.

The adhesive layer 3 can be heated directly, for example by heating the surface of the adhesive layer, in particular by way of hot air or flame application. Direct heating is also possible by way of an electric resistance heating element, for example an electric resistance heating element disposed in the adhesive layer, such as a metal mesh.

In addition or as an alternative, the adhesive layer 3 can also be heated indirectly, for example by heating the substrate S1, in particular by way of hot air or flame application. However, this requires a substrate S1 that withstands such heat input without damage. Such heat input, however, typically necessitates higher heat input.

If the heating is carried out by way of flame application, it is advantageous if the surface of the adhesive layer 3 is heated for 0.1 to 30 seconds, in particular for 5 to 20 seconds, and preferably for 10 to 15 seconds, to a temperature of 400° C. to 600° C., in particular to 450° C. to 550° C., and in particular to 480° C. to 520° C.

The heating in step ii) can be carried out chronologically before and/or during and/or after step i). If the heating in step ii) is carried out chronologically before step i), this typically take place shortly, in particular within 30 seconds, and more particularly within 10 seconds, before the application in step i).

FIG. 5 shows a schematic cross-section through a substrate S1 4 to which the sealing device 1 is partially applied. Shown is the situation during or after the heating in step ii). On the one hand, indirect heating by way of a heat source 6 is shown, wherein the heating is carried out by heating the substrate S1, typically by way of hot air or flame application. The arrows are intended to indicate the direction of the heat that is given off, proceeding from the heat source. On the other hand, FIG. 5 also shows direct heating by way of a heat source, which is typically carried out by way of hot air or flame application. In the situation shown in FIG. 5, the step i) of applying the sealing device 1 and step ii) of heating the adhesive layer 3 essentially take place simultaneously. After heating 3*a*, the adhesive layer is firmly bonded to the substrate S1. Due to the roll shape of the sealing device, the sealing device can be unrolled after being initially positioned on the substrate S1 and steps i) and ii) can be carried out.

A further aspect of the present invention relates to a method for sealing a substrate S1' 4, comprising the following steps:
i') applying a sealing device 1, which comprises an adhesive layer 3 on both sides, as it is described above, to a substrate S1' 4;
ii') heating the adhesive layer 3 of the sealing device 1 which faces the substrate S1' 4, preferably to a temperature of 80 to 600° C.;
iii') heating the adhesive layer 3 of the sealing device 1 which faces away from the substrate S1' 4, preferably to a temperature of 80 to 600° C.; and
iv') applying a substrate S2' 5 to the adhesive layer 3 of the sealing device 1 which faces away from the substrate S1' 4.

The substrate S1' 4 preferably involves substrates as they were described above as the suitable and preferred substrate S1. The method is in particular suitable for sealing a substrate St and additionally bonding it to a substrate S2' 5.

The substrate S2' 5 is preferably composed of a material as the materials that were described above as being suitable and preferred for the substrate S1.

Advantageous application and heating were described above.

A further aspect of the present invention relates to a method for sealing a substrate S1" 4, comprising the following steps:
i") applying a sealing device 1, as it is described above, to a substrate S1" 4, wherein the adhesive layer 3 faces the substrate S1" 4;
ii") heating the adhesive layer 3 of the sealing device 1, preferably to a temperature of 80 to 600° C.; and
iii") applying a substrate S2" 5 to the sealing layer 2 of the sealing device 1.

The substrate S1" 4 preferably involves substrates as they were described above as the suitable and preferred substrate S1. The method is in particular suitable for sealing a substrate St and additionally bonding it with a substrate S2" 5, wherein the S2" is able to form a firm bond with the sealing layer without the use of an adhesive promoter or an adhesive, in particular if the substrate S2" 5 has a temperature of 80 to 600° C. when it is applied to the sealing layer.

It is therefore advantageous if the substrate S2" 5 has a temperature of 80 to 600° C. when it is applied.

The substrate S2'" 5 is preferably asphalt. The application of a substrate S2'" preferably involves liquid asphalt having a temperature of 80 to 600° C.

Advantageous application and heating with respect to step i") and step ii") were described above.

A further aspect of the present invention relates to a method for sealing a substrate S1'" 4 and a substrate S2'" 5, comprising the following steps:

i'") applying a sealing device 1, as it is described above, to a substrate S1'" 4 and to a substrate S2'" 5, wherein the adhesive layer 3 faces the substrate S1'" 4 and the substrate S2'" 5; and ii'") heating the adhesive layer 3 of the sealing device 1, preferably to a temperature of 80 to 600° C.

The substrate S1'" 4 and the substrate S2'" 5 are preferably structural or civil engineering structures, the contact surface of which, or optionally the intermediate space of which between the two substrates, is to be sealed. The substrate S1'" can be concrete, for example, and the substrate can be a pipe introduced into the substrate S2'".

The sealing device 1 here fulfills the function of sealing
  penetrating elements, such as rebars, cables and the like;
  transitions between different shaped parts, such as between concrete and steel components; and
  expansion and construction joints, both in the case of site-mixed concrete and in the case of construction by means of prefabricated units.

Moreover, the substrate S1'" and S2'" can be mutually facing shaped concrete bodies. The sealing device 1 here fulfills the function of a waterstop. The sealing device 1 can also have a shape and features as they are known for waterstops to a person skilled in the art.

The material of the substrate S1'" is in particular a mineral binding agent such as concrete or gypsum, and most preferably the material is concrete, in particular concrete. The material of the substrate S2'" is preferably metal or a metal alloy, or the material of the substrate S2'" is a mineral binding agent such as concrete or gypsum, in particular concrete.

Advantageous application and heating with respect to step i'") and step ii'") were described above.

A further aspect of the present invention relates to the use of the sealing device 1 described in detail above for sealing bases.

The sealing device is typically used as a prefabricated membrane. In this case, the sealing device is preferably produced in the form of sheeting by way of an industrial process and is preferably used in the form of a sealing device unwound from a roll at the construction site. However, the sealing device can also be used in the form of strips having a width of typically 1 to 20 cm, for example so as to seal connecting points between two roofing membranes. Moreover, the sealing device can also be present and used in the form of planar bodies for repairing damaged locations in seals, for example roofing membranes.

A preferred use of the sealing device 1 is thus a use for sealing structural and civil engineering projects, in particular of roofs and floors, against moisture.

A further aspect of the present invention relates to a method for producing a sealing device 1, as it was described above in detail, wherein the sealing layer 2 and/or the adhesive layer 3 are produced by way of calendering and/or extrusion and/or co-extrusion and/or lamination.

The sealing layer 2 is preferably bonded to the adhesive layer 3 by way of calendering and/or co-extrusion. The sealing device 1 can moreover be produced as endless material and rolled to form rolls, for example.

It can further be advantageous if portions of the sealing layer 2 are foamed during production, wherein the above-described foamed portions of the sealing layer 2a are obtained. This is typically achieved by way of physical and/or chemical expanding agents, which are optionally present in the sealing layer 2.

In a further aspect, the present invention relates to a shaped body, wherein the shaped body is firmly bonded to the adhesive layer 3 of the sealing device 1 by prior heating of the adhesive layer 3. The shaped body is typically a structural or civil engineering structure. The term "shaped body" denotes an object having a three-dimensional expansion.

For example, FIG. 6 shows a shaped body composed of a substrate S1, which is bonded to the sealing layer 2 by way of the adhesive layer 3a. The shaped body is preferably a prefabricated unit, which is industrially produced. Industrial production allows more controlled heat input into the adhesive layer than is possible at a construction site, for example. It can therefore be advantageous to dispense with a foamed portion 2a of the sealing layer. Such shaped bodies can be sealed prefabricated elements for tunnels, water pipes, sewers, flooring and the like, for example.

For example, FIG. 7 shows a shaped body composed of a substrate S1 4, which is bonded to the sealing layer 2 by way of the adhesive layer 3a. The sealing layer comprises a foamed portion 2a. Such shaped bodies can be sealed roofs and floors, for example, in particular such made of concrete.

For example, FIG. 8 shows a shaped body composed of a substrate S1 4, which is bonded to the sealing layer 2 by way of a first adhesive layer 3a. The sealing layer comprises a foamed portion 2a. A substrate S2 5 is bonded to a second foamed portion 2b of the sealing layer 2 by way of a further adhesive layer 3a.

For example, FIG. 9 shows a shaped body composed of a substrate S1 4, which is bonded to the sealing layer 2 by way of a first adhesive layer 3a. The sealing layer comprises a foamed portion 2a. A substrate S2 5 is bonded directly to the sealing layer 2. Such shaped bodies can be a roadway structure, for example, in which the concrete substructure (substrate S1) is sealed with the aid of the sealing device and to which the asphalt (substrate S2) is applied.

For example, FIG. 10 shows a shaped body composed of a substrate S1 4 and a substrate S2 5, which are bonded to the sealing layer 2 by way of the adhesive layer 3a. The sealing layer comprises a foamed portion 2a. Such shaped bodies can be sealed floors, for example, in particular such made of concrete. The sealing device is a waterstop, for example.

For example, FIG. 11 shows a shaped body composed of a substrate S1 4 and a substrate S2 5, which are bonded to the sealing layer 2 by way of the adhesive layer 3a. The sealing layer comprises a foamed portion 2a. Such shaped bodies can be sealed penetrating elements or transitions between different substrates, for example. S1 is a floor, for example, in particular one made of concrete, and substrate S2 is a pipe made of metal or a metal alloy, penetrating the floor.

LIST OF REFERENCE NUMERALS 1 sealing device
2 sealing layer
2a foamed portion of the sealing layer
2b foamed portion of the sealing layer
3 adhesive layer
3a adhesive layer after heating 4 substrate S1
5 substrate S2
6 heat source, or direction of the heat that is given off, proceeding from the heat source
9 carrier layer
10 topcoat

EXAMPLES

Experiments with Concrete Specimen

Production of Adhesive Layers:

Blends made of the ethylene-vinyl acetate copolymer P2, optionally the polymer P3 and optionally azodicarbonamide were extruded on a co-rotating twin-screw extruder made by OMC (temperature 110° C., rotational screw speed 200 revolutions/minute).

Production of the Test Specimen:

Test membranes were produced by first enclosing a reinforcing glass nonwoven having a thickness of 0.2 mm with two layers made of the above-described adhesive layer, each having a thickness of 0.8 mm, by way of compression molding at 110° C. for 1 minute.

If the adhesive layers that were used did not include any azodicarbonamide, the test membrane was heated to a temperature of 200° C. by placing it onto a polytetrafluoroethylene panel having such a temperature. Once this temperature was reached, a concrete test specimen (12×70 mm, height 25 mm; Rocholl, cut according to ISO 13640, method 1) was placed on the heated test membrane, additionally weighted with a weight of an additional 150 g and left in place for 2 minutes. The test specimen thus obtained was then removed from the polytetrafluoroethylene panel and allowed to cool to room temperature.

If the adhesive layers that were used included azodicarbonamide, the test membrane was placed onto a polytetrafluoroethylene panel and heated for one minute with an industrial hot blow dryer from a distance of 10 cm. Thereafter, a concrete test specimen (12×70 mm, height 25 mm; Rocholl, cut according to ISO 13640, method 1) was placed on the activated test membrane, additionally weighted with a weight of an additional 150 g and left in place for 2 minutes. The test specimen thus obtained was then removed from the polytetrafluoroethylene panel and allowed to cool to room temperature.

Application of the Primer:

For the test series that used test bodies with primer, one side of the concrete test specimen (12×70 mm, height 25 mm; Rocholl, cut according to ISO 13640, method 1) was treated in advance with an epoxy resin primer (Sika Primer 210 in the examples of FIG. 18; Sikagard 186 in the examples of FIG. 21; both from Sika Schweiz AG) in accordance with the manufacturer's instructions. The treated side was then placed on the heated test membrane.

Measurement of the Test Specimen:

90° peel tests (at 23° C. and 50% humidity) were carried out on the test specimen that were obtained, using a tensile testing machine (Zwick), at a constant cross beam speed of 100 mm/min.

| P2 | P2-1 | EVA copolymer (28% by weight vinyl acetate, MFI 3), Elvax 265, DuPont |
| | P2-2 | EVA copolymer (18% by weight vinyl acetate, MFI 0.7), Elvax 470, DuPont |
| | P2-3 | EVA copolymer (12% by weight vinyl acetate, MFI 0.35), Elvax 670, DuPont |
| | P2-4 | EVA copolymer (28% by weight vinyl acetate, MFI 0.5), Elvax CM4875, DuPont |
| | P2-5 | EVA copolymer (28% by weight vinyl acetate, MFI 6), Elvax 260A, DuPont |
| P3 | P3 | LDPE-MAH, Bynel 42E703, DuPont |
| A | Azo | Azodicarbonamid, Unicell DL75N, Dongjin Semichem Co. |
| | OBSH | 4,4'-Oxybis benzenesulfony hydrazide (OBSH), Luvopor OB, Lehmann +Voss |
| | DP | Radikalspender, Dicumyl peroxide |
| | Prim | Epoxidharz-Primer, Sika Primer 210, Sika Schweiz AG |
| | Epoxy | Bisphenol A-basiertes Epoxy-Festharz, GT 7004, Huntsman |

The term "MFI" in the present document shall be understood to mean the melt flow index, measured at 190° C./2.16 kg according to the ASTM D1238 standard, indicated in g/10 min.

FIG. 12 shows 90° peel tests of adhesive layers composed of 95% by weight P2-5 and 5% by weight azodicarbonamide (Azo), and 5% by weight of the chemical inflation agent 4,4'-Oxybis benzenesulfony hydrazide (OBSH), and 5% by weight of the radical starter dicumyl peroxide (DP).

FIG. 13 shows 90° peel tests of adhesive layers composed of the amounts of azodicarbonamide indicated in FIG. 13 in % by weight, the ethylene-vinyl acetate copolymer P2-1 accounts for the remainder of the composition. The results of the measurement series, in which the untreated concrete test body was used, are marked "without primer." The results of the measurement series in which concrete test bodies pretreated with epoxy primer were used are marked "with primer."

FIG. 14 shows 90° peel tests of adhesive layers composed of the amounts of polymer P3 indicated in FIG. 14 in % by weight, and the indicated amounts of azodicarbonamide in % by weight, the ethylene-vinyl acetate copolymer P2-1 accounts for the remainder of the composition. Concrete test bodies pretreated with epoxy primer were used.

FIG. 15 shows 90° peel tests of adhesive layers composed of ethylene-vinyl acetate copolymer P2-1 as well as the amounts of polymer P3 indicated in FIG. 15, and the indicated amounts of azodicarbonamide (Azo), in % by weight. The results of FIG. 15 are shown in FIG. 16 as the ratio of the % by weight of (Azo: P3). Untreated concrete test bodies were used.

FIG. 17 shows 90° peel tests of adhesive layers consisting of ethylene-vinyl acetate copolymer P2-1, 5% by weight azodicarbonamide (Azo) as well as the amounts of polymer P3 indicated in FIG. 17. Untreated concrete test bodies were used.

FIG. 18 shows 90° peel tests of adhesive layers composed of 5% by weight azodicarbonamide (Azo) and 95% by weight ethylene-vinyl acetate copolymer P2-3 (VA content 12% by weight), and 95% by weight ethylene-vinyl acetate copolymer P2-2 (VA content 18% by weight), and 95% by weight ethylene-vinyl acetate copolymer P2-4 (VA content 28% by weight). The results of the measurement series in which untreated concrete test bodies were used, are marked "without primer." The results of the measurement series in which concrete test bodies pretreated with epoxy resin were used are marked "with primer."

Figure 1:
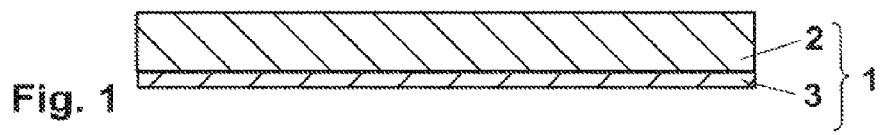
Figure 2:
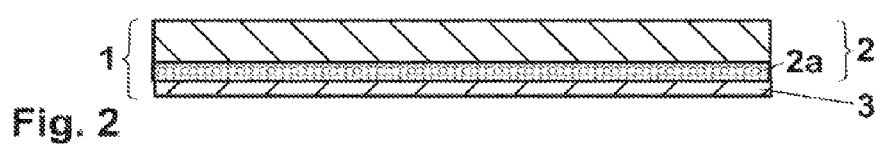
Figure 3:
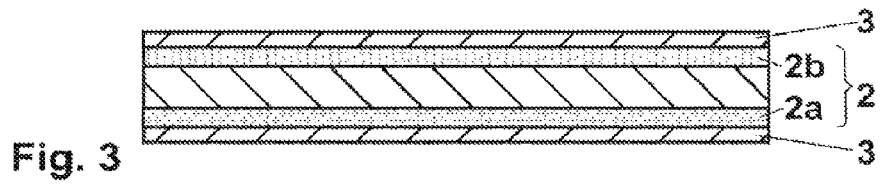
Figure 4:
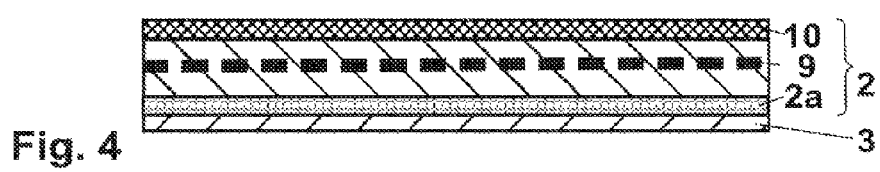
Figure 5:
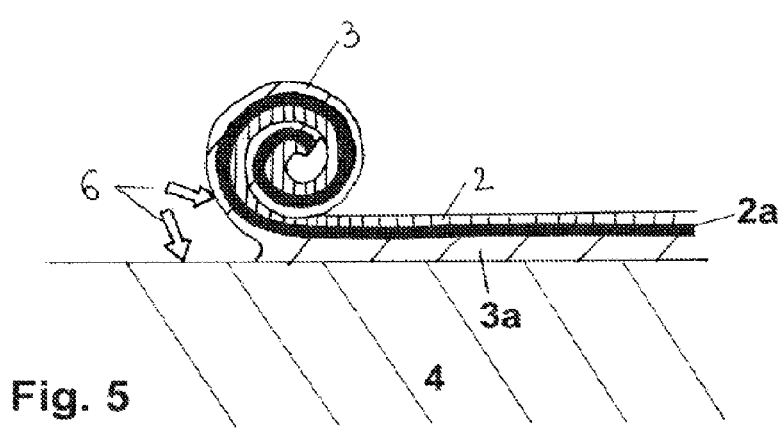
Figure 6:
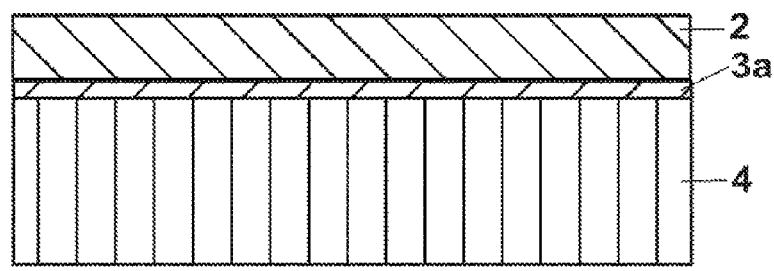
Figure 7:
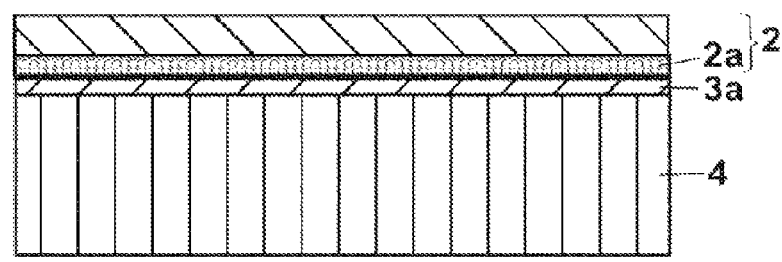
Figure 8:
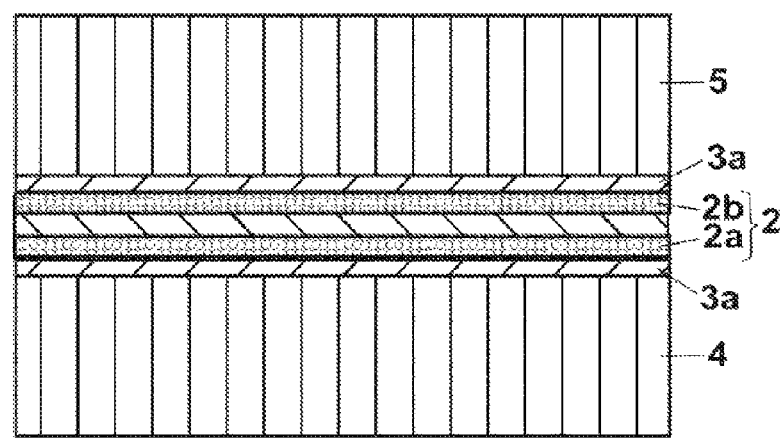
Figure 9:
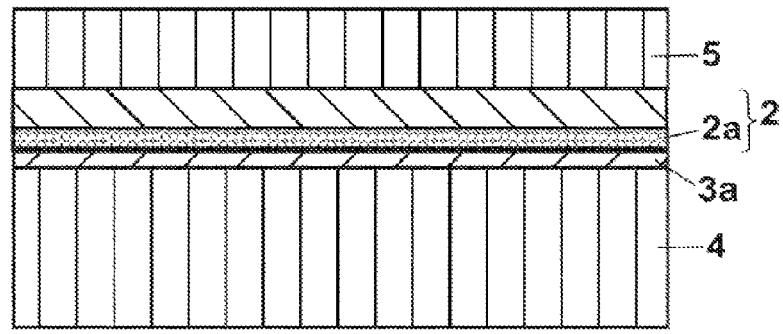
Figure 10:
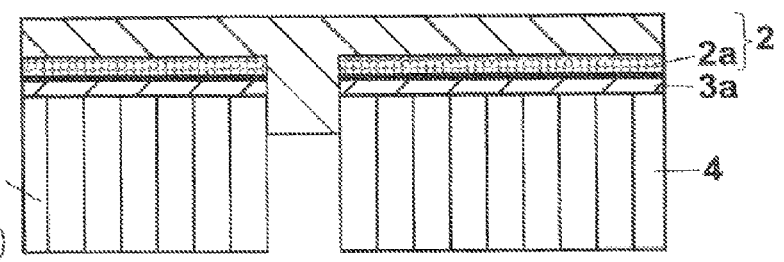
Figure 11:
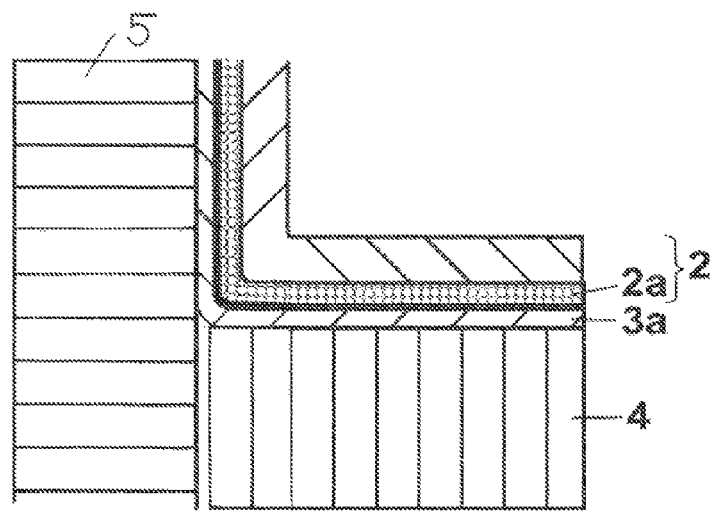
Figure 12:
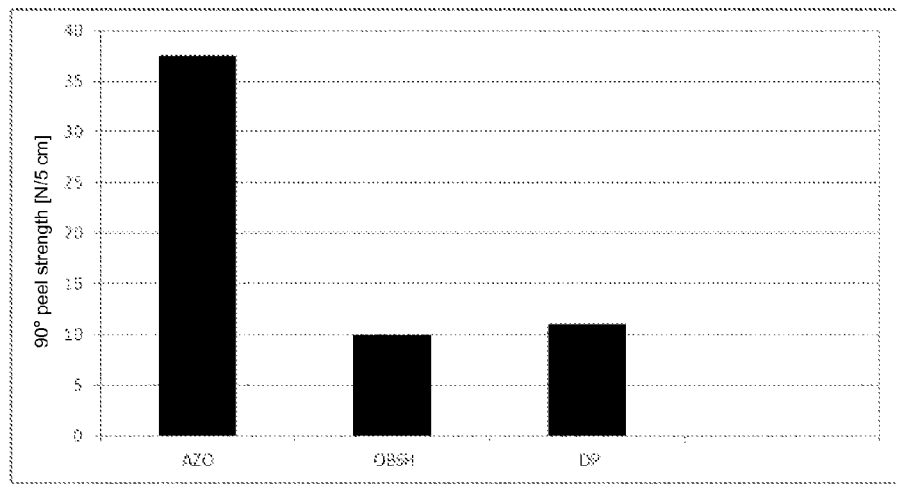
Figure 13:
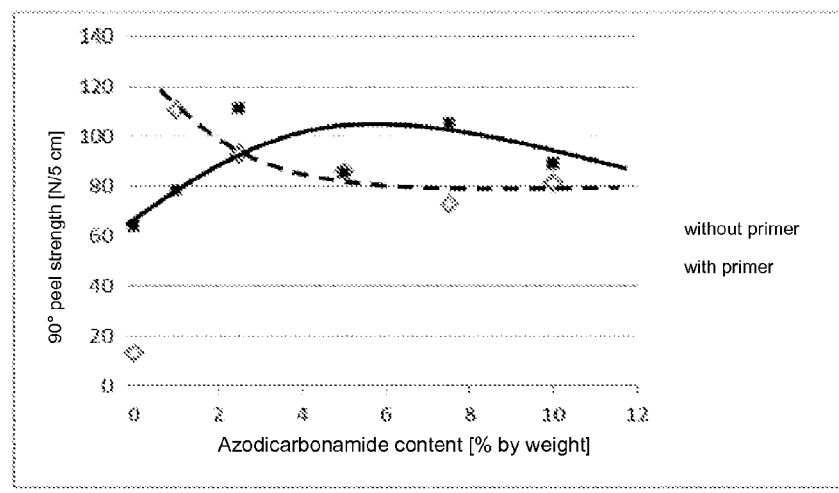
Figure 14:
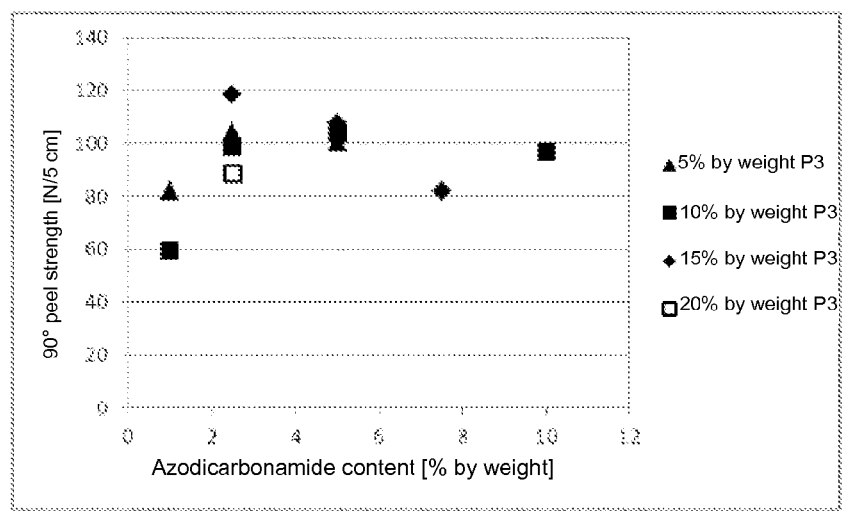
Figure 15:
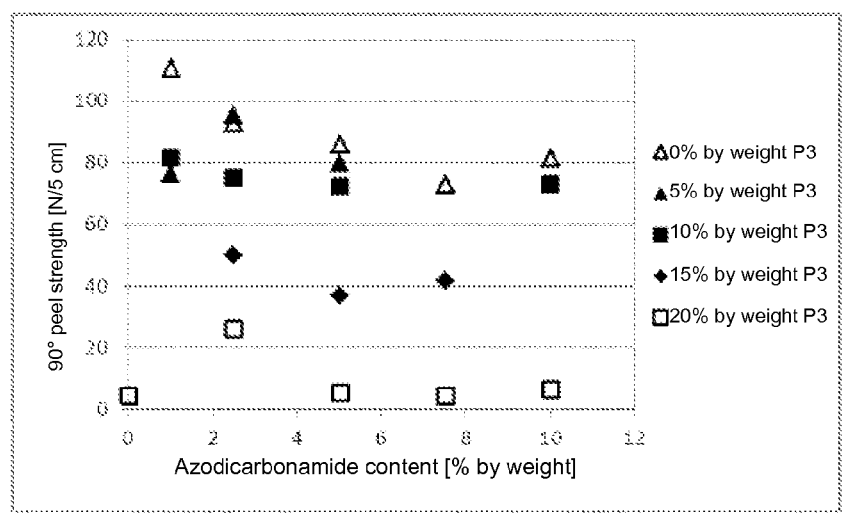
Figure 16:
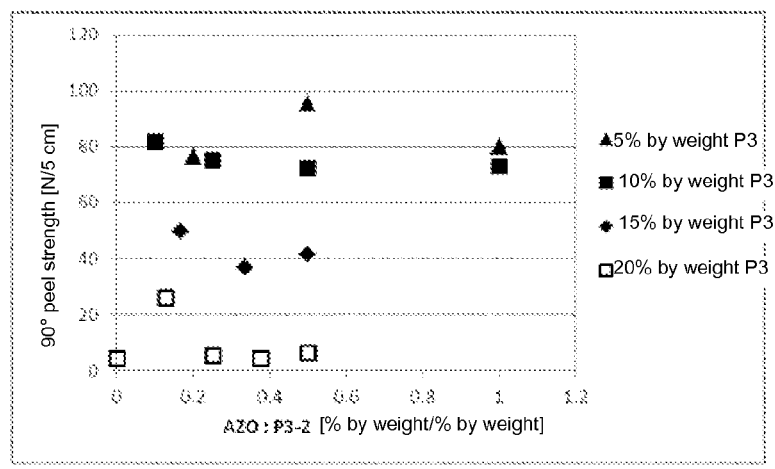
Figure 17:
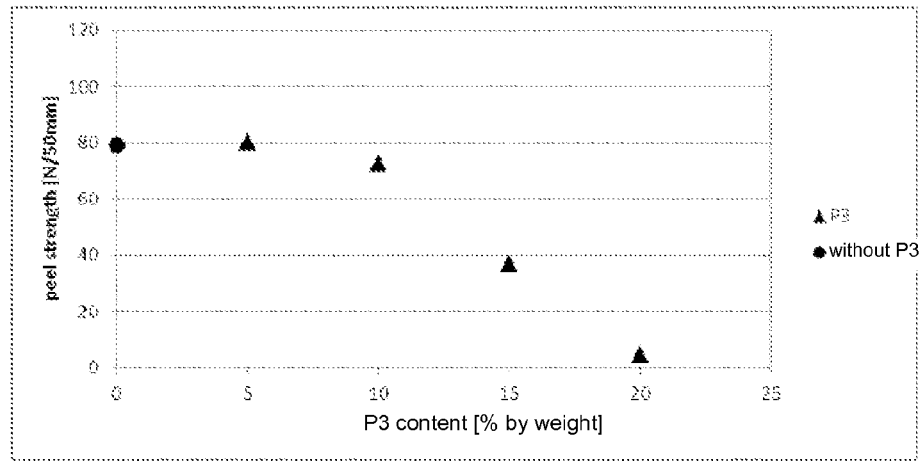
Figure 18:
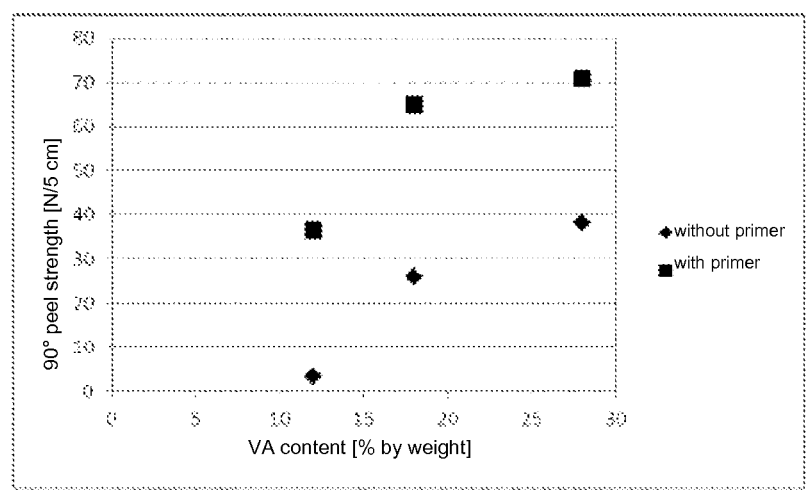
Figure 19:
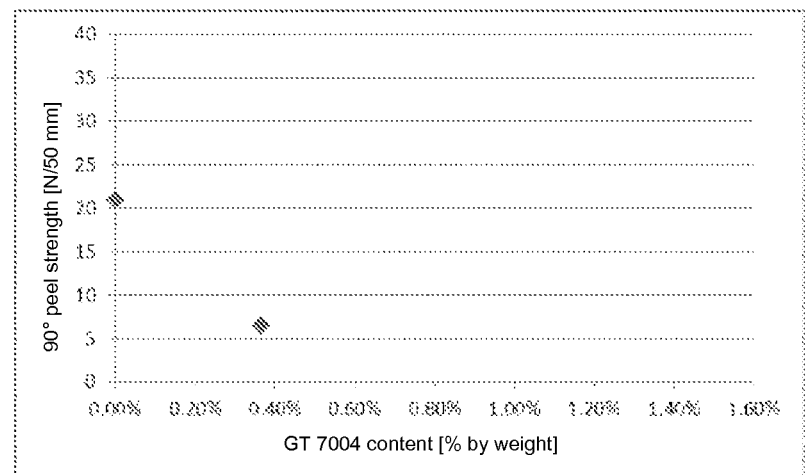
FIG. 19 shows 90° peel tests with adhesive layers composed of ethylene-vinyl acetate copolymer P2-1, 10% by weight polymer P3 as well as the amount of epoxy resin GT 7004 indicated in FIG. 19 (no azodicarbonamide).
Figure 20:
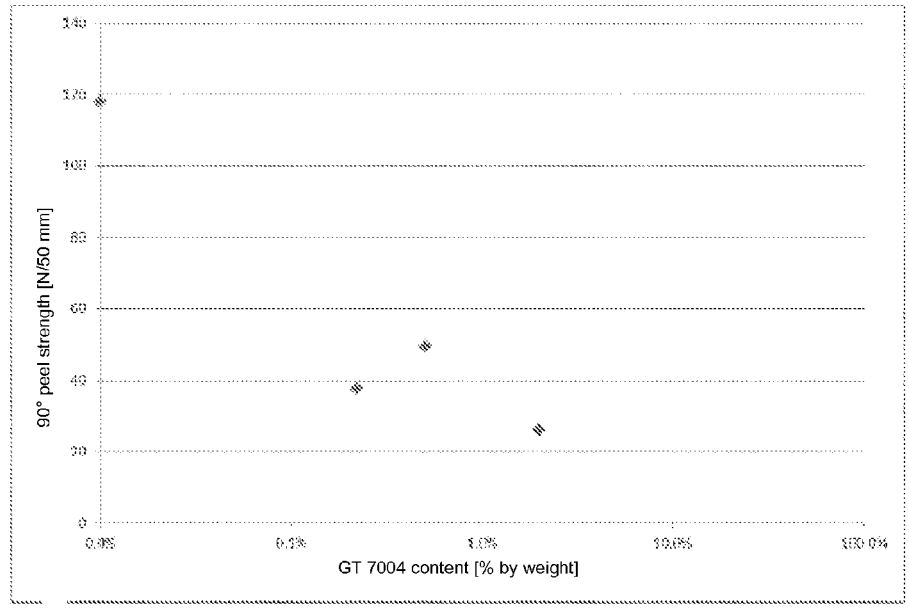
FIG. 20 shows 90° peel tests of adhesive layers composed of ethylene-vinyl acetate copolymer P2-1, 10% by weight polymer P3, 5% by weight azodicarbonamide (Azo) as well as the amount of epoxy resin GT 7004 indicated in FIG. 20.
Figure 21:
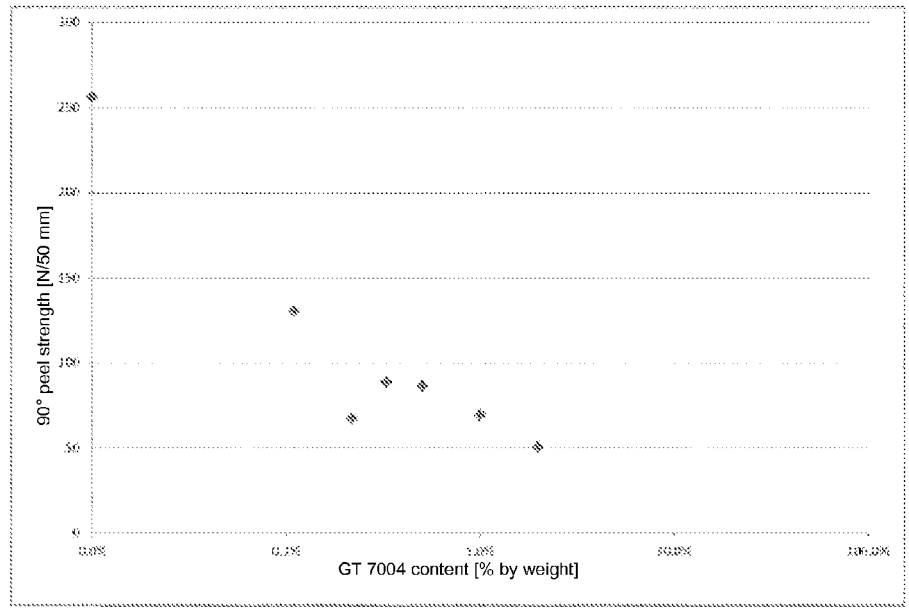
FIG. 21 shows 90° peel tests of adhesive layers composed of ethylene vinyl acetate copolymer P2-1, 10% by weight polymer P3, 5% by weight azodicarbonamide (Azo) and the amount of epoxy resin GT 7004 shown in FIG. 21. Concrete test specimen were used in the peel tests of FIG. 21, which were treated in advance with an epoxy resin primer as described above.

Experiment for Heat Input into an Adhesive Layer:

The above-described adhesive layers were produced in two different thicknesses, a thickness of 2 mm on the one hand and a thickness of 0.3 mm on the other hand. Those mentioned first were placed directly onto a base (concrete); on those mentioned second, the adhesive layer was bonded with a foam layer measuring 1.7 mm thick and having a density of approximately 0.5 g/cm$^3$ by way of a hot press before they were placed (with the foam layer facing the base) onto the base (concrete). Thereafter, the surface of the adhesive layers facing away from the base was heated by way of an IR heater (KRELUS, output P=4.3 kW, radiator field 24 cm×56 cm) at a distance of 8 cm. The adhesive layers comprising a foam layer behind the adhesive layer were activated twice as quickly. Moreover, a change in color was discernible in all activated adhesive layers as compared to the non-activated state.

Adhesive Tests on Different Substrates:
Preparation of the Test Membranes:

An adhesive layer was prepared consisting of:
Celogen AZ 130, 9% by weight,
Zinc oxide, 3% by weight,
Bynel CXA 42E703, 13% by weight,
EVA with a VA content of 12%, 75% by weight,
and coextruded together with a layer of foamed EVA (VA content 14%, foam density approximately 0.5 g/cm$^3$) on a concurrent twin-screw extruder (combing, L/D=44:1) of the company Berstorff (Germany) according to the following extruder parameters and at an extruder number of revolutions of 130 rpm.

| Extrusion parameters | | | | | | | | | |
|---|---|---|---|---|---|---|---|---|---|
| Area | | | | | | | | | |
| | T1 | T2 | T3 | T4 | T5 | T6 | T7 | T8 | T9 |
| Temp [° C.] | 30 | 50 | 82 | 105 | 113 | 120 | 120 | 120 | 105 |

The thickness of the adhesive layer was approximately 0.4 mm, the thickness of the foam layer was approximately 1.8 mm. The test membrane contained furthermore a reinforcing glass nonwoven, an additional unfoamed sealing layer of approximately 0.9 mm as well as a topcoat of 0.3 mm. The width of the membrane from the extruder on was approximately 30 cm.

Sample Preparation:

Strips of the test membranes having the dimensions 80 cm×30 cm×3.4 mm were produced and heated at a rate of approximately 1 m/min with a heating gun (width approximately 25 cm, power approximately 40 kW, distance of 10 cm from adhesive layer), and pressed immediately with contact pressure (pressing roller of 35 kg per 25 cm width) onto the substrate. The test body was stirred at standard atmospheric conditions (23° C./50% relative humidity) for 1 day. Subsequently, a 50-mm wide test strip was cut into the membrane and the peel strength was determined by way of a dynamometer (hand peel test) or on a Zwick dynamic testing machine (machine peel test) at a peeling angle of 90°.

| Substrate | Adhesion with hand peel test |
|---|---|
| Concrete | ++ |
| Stoneware (fine) top side | + |
| Stoneware back side | ++ |
| Stoneware back side | ++ |
| Ytong (porous concrete) | + |

++ = >200 N/5 cm
+ = >100 N/5 cm, <200 N/5 cm

| Substrate | Adhesion with machine peel test |
|---|---|
| Concrete without primer | 300 N/5 cm |
| Wood, oriented strand board (OSB) without primer | 180 N/5 cm |
| Wood, oriented strand board (OSB) with Sikagard 186 | 500 N/5 cm |
| Zinc sheet without primer | 400 N/5 cm |
| Zinc sheet with Sikagard 186 | 400 N/5 cm |

Epoxy resin primer, Sikagard-186, Sika Schweiz AG, was mixed beforehand according to the processing guidelines of the manufacturer (Comp. A: Comp. B=4:1) applied using rollers onto the corresponding substrate, and then cured for 7 days.

The invention claimed is:

1. A sealing device comprising:
a sealing layer comprising a thermoplastic polymer;
and an adhesive layer comprising:
at least one ethylene-vinyl acetate copolymer; and
an azodicarbonamide;
wherein the adhesive layer comprises from 0 to 0.5 wt. % of an epoxy resin, based on the total weight of the adhesive layer.

2. The sealing device according to claim 1, wherein the ethylene-vinyl acetate copolymer comprises from about 25 wt. % to about 30 wt. % vinyl acetate.

3. The sealing device of claim 1, wherein the azodicarbonamide is present from about 0.5 wt. % to about 2 wt. %, based upon a total weight of the ethylene-vinyl acetate copolymer and the azodicarbonamide.

4. The sealing device of claim 1, wherein the azodicarbonamide is present from about 4 wt. % to about 8 wt. % based upon a total weight of the ethylene-vinyl acetate copolymer and the azodicarbonamide.

5. The sealing device of claim 1, wherein the ethylene-vinyl acetate copolymer comprises about 7 wt. % to about 30 wt. % vinyl acetate.

6. The sealing device of claim 1, wherein the azodicarbonamide is present from about 0.1 wt. % to about 15 wt. % based upon a total weight of the ethylene-vinyl acetate copolymer and the azodicarbonamide.

7. The sealing device of claim 1, wherein the azodicarbonamide is present from about 2 wt. % to about 10 wt. % based upon a total weight of the ethylene-vinyl acetate copolymer and the azodicarbonamide.

8. The sealing of claim 1, wherein the adhesive layer further comprises a polymer selected from the group consisting of a maleic acid anhydride-functionalized polyethylene and a maleic acid anhydride-functionalized copolymer made of ethylene and vinyl acetate.

9. The sealing device of claim 8, wherein the polymer is present from about 4 wt. % to about 17 wt. %, and the azodicarbonamide is present from about 2 wt. % to about 6 wt. % based upon a total weight of ethylene-vinyl acetate copolymer, polymer, and azodicarbonamide.

10. The sealing of claim 8, wherein the polymer is a maleic acid anhydride-functionalized polyethylene that comprises maleic acid anhydride-functionalized low density polyethylene or maleic acid anhydride-functionalized high density polyethylene.

11. The sealing of claim 8, wherein the polymer is a maleic acid anhydride-functionalized copolymer comprising ethylene and vinyl acetate.

12. The sealing device of claim 1, wherein the adhesive layer is free of epoxy resin.

13. The sealing device of claim 1, wherein the sealing layer comprises a foamed portion on a side facing the adhesive layer.

14. The sealing device of claim 1, wherein the adhesive layer is tack-free at 23° C.

15. A method for sealing a substrate, the method comprising:
applying the sealing device of claim 1 to the substrate, wherein the adhesive layer faces the substrate; and
heating the adhesive layer.

16. The method of claim 15, wherein the heating comprises heating to a temperature of about 80° C. to about 600° C.

17. The method of claim 15 further comprising applying a second substrate to the sealing layer after heating the adhesive layer.

18. The method according to claim 17, wherein the second substrate is asphalt.

* * * * *